US008315903B2

(12) United States Patent
Zucker

(10) Patent No.: US 8,315,903 B2
(45) Date of Patent: *Nov. 20, 2012

(54) METHOD FOR CROSS-PROMOTING COMMUNICATIONS SERVICES

(75) Inventor: Nehemia Zucker, Encino, CA (US)

(73) Assignee: j2 Global Communications, Hollywood, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/946,633

(22) Filed: Nov. 15, 2010

(65) Prior Publication Data

US 2011/0060638 A1 Mar. 10, 2011

Related U.S. Application Data

(63) Continuation of application No. 11/040,507, filed on Jan. 21, 2005, now Pat. No. 7,835,941.

(51) Int. Cl.
*G06Q 30/00* (2012.01)
(52) U.S. Cl. ............... 705/14.27; 705/14.32; 705/14.33
(58) Field of Classification Search .............. 705/14.27, 705/14.13, 14.23, 14.49, 14.32, 14.33
See application file for complete search history.

(56) References Cited

U.S. PATENT DOCUMENTS

| 3,852,576 | A | * | 12/1974 | Rudd | 377/5 |
|---|---|---|---|---|---|
| 5,297,026 | A | * | 3/1994 | Hoffman | 705/14.18 |
| 5,987,424 | A | | 11/1999 | Nakamura | |
| 6,076,068 | A | * | 6/2000 | DeLapa et al. | 705/14.26 |
| 6,424,426 | B1 | * | 7/2002 | Henry | 358/1.15 |
| 6,477,578 | B1 | * | 11/2002 | Mhoon | 709/229 |
| 6,564,193 | B1 | * | 5/2003 | Shore et al. | 705/400 |
| 6,574,606 | B1 | * | 6/2003 | Bell et al. | 705/14.27 |
| 6,594,640 | B1 | * | 7/2003 | Postrel | 705/14.27 |
| 6,622,124 | B1 | | 9/2003 | Kolls | |
| 6,625,258 | B1 | * | 9/2003 | Ram et al. | 379/88.13 |
| 6,708,215 | B1 | * | 3/2004 | Hingorani et al. | 709/229 |
| 6,741,968 | B2 | * | 5/2004 | Jacoves et al. | 705/14.23 |
| 6,829,586 | B2 | | 12/2004 | Postrel | |
| 6,947,898 | B2 | | 9/2005 | Postrel | |
| 7,051,003 | B1 | * | 5/2006 | Kobata et al. | 705/51 |
| 7,065,070 | B1 | * | 6/2006 | Chang | 370/352 |
| 7,089,209 | B1 | | 8/2006 | Kolls | |
| 7,164,488 | B2 | * | 1/2007 | Henry | 358/1.15 |
| 7,231,594 | B1 | * | 6/2007 | Hitchcock et al. | 715/229 |
| 7,318,049 | B2 | * | 1/2008 | Iannacci | 705/39 |

(Continued)

FOREIGN PATENT DOCUMENTS

JP 11353555 12/1999

(Continued)

OTHER PUBLICATIONS

Wikipedia; Find me/Follow me; http://en.wikipedia.org/wiki/Find_me_follow_me; accessed Apr. 12, 2011.*

(Continued)

*Primary Examiner* — John Weiss
*Assistant Examiner* — Adam Chornesky
(74) *Attorney, Agent, or Firm* — Blakely, Sokoloff, Taylor & Zafman LLP

(57) ABSTRACT

A method to promote use of one communication service by associating it with another service and offering incentives to use the first service in return for use of the second service. Other embodiments are also described and claimed.

5 Claims, 4 Drawing Sheets

U.S. PATENT DOCUMENTS

| | | | |
|---|---|---|---|
| 7,564,577 B2 | 7/2009 | Atsumi | |
| 7,835,941 B2 * | 11/2010 | Zucker | 705/14.27 |
| 2001/0023408 A1 * | 9/2001 | Mc.Evoy et al. | 705/14 |
| 2001/0029176 A1 * | 10/2001 | Taniguchi | 455/413 |
| 2001/0037243 A1 * | 11/2001 | Rouston et al. | 705/14 |
| 2001/0054003 A1 * | 12/2001 | Chien et al. | 705/14 |
| 2002/0013728 A1 * | 1/2002 | Wilkman | 705/14 |
| 2002/0019772 A1 * | 2/2002 | Hillier et al. | 705/14 |
| 2002/0032609 A1 * | 3/2002 | Wilkman | 705/14 |
| 2002/0067376 A1 * | 6/2002 | Martin et al. | 345/810 |
| 2002/0077906 A1 * | 6/2002 | Remler | 705/14 |
| 2002/0091571 A1 | 7/2002 | Thomas et al. | |
| 2002/0123929 A1 * | 9/2002 | Speicher | 705/14 |
| 2002/0126304 A1 * | 9/2002 | Jakobsson et al. | 358/1.12 |
| 2002/0126813 A1 * | 9/2002 | Partovi et al. | 379/114.12 |
| 2002/0143614 A1 * | 10/2002 | MacLean et al. | 705/14 |
| 2002/0152123 A1 * | 10/2002 | Giordano et al. | 705/14 |
| 2002/0174011 A1 * | 11/2002 | Sanchez et al. | 705/14 |
| 2002/0188503 A1 | 12/2002 | Banerjee et al. | |
| 2002/0188527 A1 | 12/2002 | Dillard et al. | |
| 2003/0020959 A1 * | 1/2003 | Henry | 358/402 |
| 2003/0097310 A1 | 5/2003 | Ono et al. | |
| 2003/0115100 A1 * | 6/2003 | Teicher | 705/14 |
| 2003/0171987 A1 * | 9/2003 | Amato et al. | 705/14 |
| 2003/0177101 A1 * | 9/2003 | Ferris | 705/65 |
| 2003/0220835 A1 * | 11/2003 | Barnes, Jr. | 705/14 |
| 2003/0220866 A1 | 11/2003 | Pisaris-Henderson et al. | |
| 2003/0225619 A1 * | 12/2003 | Dokken et al. | 705/14 |
| 2004/0010462 A1 * | 1/2004 | Moon et al. | 705/39 |
| 2004/0122730 A1 | 6/2004 | Tucciarone et al. | |
| 2005/0105139 A1 | 5/2005 | Atsumi | |
| 2005/0261916 A1 * | 11/2005 | McCall et al. | 705/1 |
| 2006/0010033 A1 * | 1/2006 | Thomas | 705/14 |
| 2006/0095318 A1 * | 5/2006 | Ross et al. | 705/14 |
| 2006/0101116 A1 * | 5/2006 | Rittman et al. | 709/204 |
| 2006/0167746 A1 | 7/2006 | Zucker | |
| 2007/0274483 A1 * | 11/2007 | Shapiro | 379/114.12 |
| 2008/0126208 A1 * | 5/2008 | Nicholson et al. | 705/14 |
| 2011/0060638 A1 * | 3/2011 | Zucker | 705/14.27 |

FOREIGN PATENT DOCUMENTS

| | | |
|---|---|---|
| JP | 2002083186 | 3/2002 |
| JP | 2004139388 | 5/2004 |

OTHER PUBLICATIONS

Hisey, Pete "Storming the Store Card Gates", Credit Card Management, Jul. 1997, pp. 82-85.*

Molotsky, Irvin; "Travel Advisory; Air Miles Suspended"; New York Times May 30, 1993.*

Smith, Brian; "A Brief History of Air Miles"; Marketing Week; Jun. 11, 1998.*

Fletcher, Richard; "Sainsbury's test of loyalty"; Telegraph Media Group Limited Sep. 8, 2002.*

Upton, Gill; "Relationship Marketing: How Air Miles took off"; Brand Republic Oct. 8, 1998.*

Rogers, Daniel; "Loyalty Schemes—Air Miles prepares for Nectar launch"; Marketing Magazine Sep. 5, 2002.*

Waine, Toby; "Cards Offer Air Miles for British Customers"; Daily Mail Aug. 25, 2002.*

Stone et al.; "The Effect of Retail Customer Loyalty Schemes—Detailed Measurement or Transforming Marketing?"; Journal of Targeting, Measurement & Analysis for Marketing; vol. 12, Iss. 3, pp. 305-318 (2004).*

DialogSrch07jul2012; no hits found for inventor or discounts for receiving a credit for incoming faxes; Jul. 7, 2012.*

DialogSrch07jul2012A; no hits found for inventor or discounts for receiving a credit for incoming faxes; Jul. 7, 2012.*

PCT International Search Report (dated Jul. 16, 2007), International Application No. PCT/US 05/45041, International Filing Date Dec. 13, 2005, (8 pages).

Non-Final Office Action (dated Feb. 18, 2009), U.S. Appl. No. 11/040,507, filed Jan. 21, 2005, First Named Inventor: Nehemia Zucker, (24 pages).

Final Office Action (dated Oct. 28, 2009), U.S. Appl. No. 11/040,507, filed Jan. 21, 2005, First Named Inventor: Nehemia Zucker, (31 pages).

Ex Parte Quayle Action (dated Apr. 8, 2010), U.S. Appl. No. 11/040,507, filed Jan. 21, 2005, First Named Inventor: Nehemia Zucker, (12 pages).

Anderson, Kare, "Cross-Promotions Can Create a Passion Bond With Customers ©", Pertinent Information Ltd., Victoria, BC Canada (http://www.pertinent.com) Wednesday, Apr. 20, 2005, (5 pages).

Lowery, Shelley, "Cross Promoting With Recommendations", SitePro News, ROIbot V.8 Internet Tools (Feb. 15, Issue 138), (3 pages).

* cited by examiner

METHOD FOR CROSS-PROMOTING COMMUNICATIONS SERVICES

RELATED MATTERS

This application is a continuation of pending U.S. application Ser. No. 11/040,507, filed Jan. 21, 2005, entitled "Method for Cross-Promoting Communications Services", currently pending.

BACKGROUND

The growth and adoption of wide-area data networks such as the Internet have enabled merchants to offer a number of new services to consumers. These services often center around data manipulation and storage, and can be provided to a large number of consumers without significant setup or operational expense. As a result, merchants often provide these services to consumers gratis, and look to alternate revenue sources such as advertising and data aggregation (that is, collection and sale of data about consumers' preferences and habits) in hopes of creating a viable business. Unfortunately, operating a service business in this manner engenders a feeling of entitlement to future free service among consumers. Consequently, merchants find it difficult to provide new services which do require significant investment or operating capital, because consumers are reluctant to try a new service that is not free, yet many services cannot economically be provided for the amount of money that can be earned by advertising or data aggregation.

Merchants have commonly addressed this problem by simply offering the new, expensive-to-provide service gratis (and at a financial loss) during an introductory period, in the hope that consumers will find the service valuable or indispensable and continue to use it when the introductory period terminates and the service must be paid for. However, this all-or-nothing approach does not work well given consumers' feelings of entitlement to free services; even if the new service is convenient or useful, a consumer faced with the choice to "pay up" or get out will often grumble and stop using the service, and may become annoyed enough to abandon the merchant's other services as well.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1A:
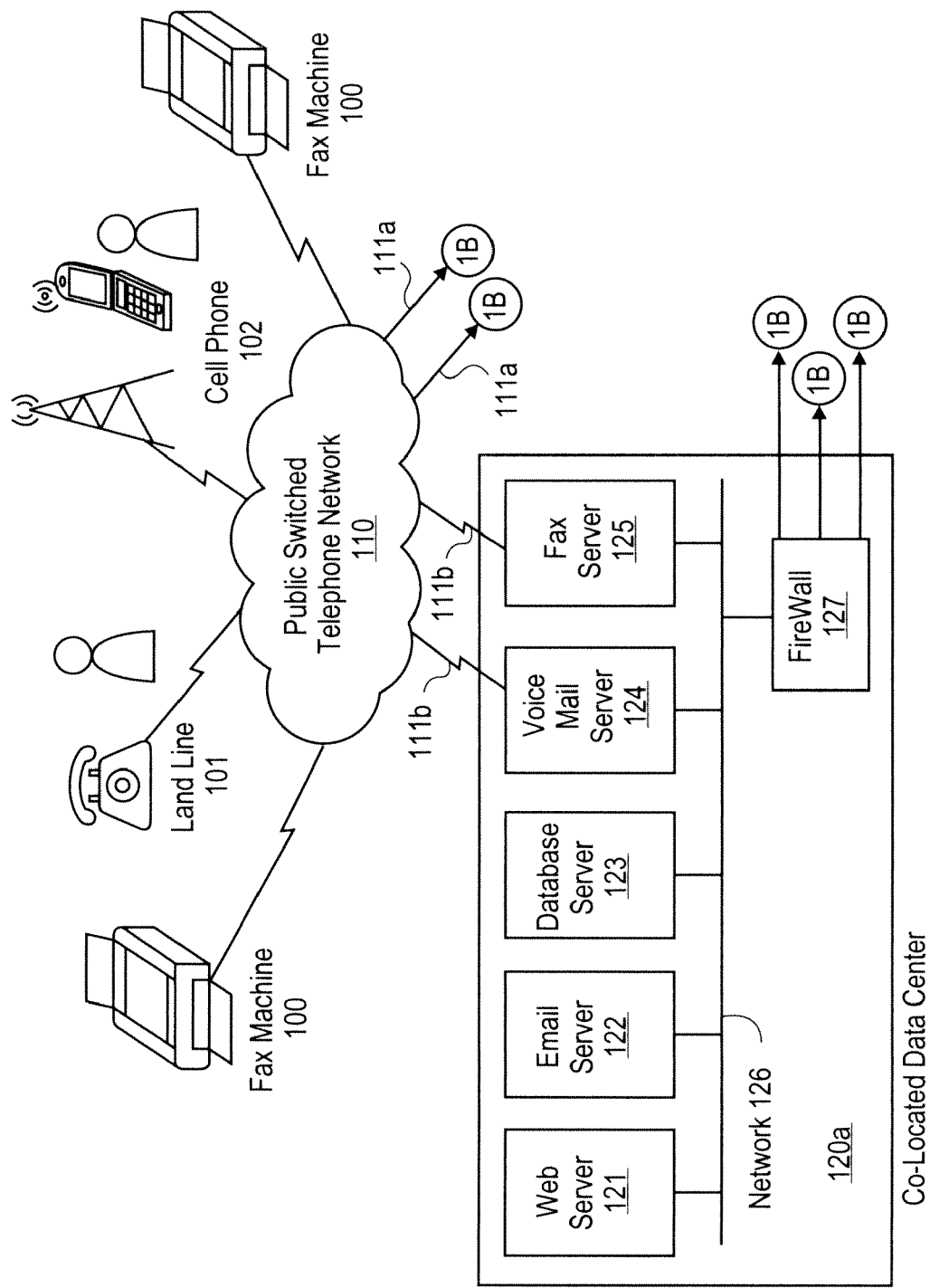
FIGS. 1A and 1B depict an overview of the components that may be involved in one or more embodiments of the invention.

In the information-services realm, and particularly in the realm of communication services, a single performance of a service is often of very small value, yet the ability to obtain that service at any time is important and valuable. This disparity is reflected in the pricing structure for Internet services, for example. Currently, most businesses charge a fee for generalized Internet access (hourly, or more commonly, monthly) but do not impose any extra charge for amount of data transferred, number of websites visited, or number of electronic mail messages sent or received, although it would be technologically feasible to do so.

A further economic pressure that favors pay-for-availability over pay-per-use pricing is the high (relative) transaction cost associated with small monetary value transactions. As previously noted, the value of receiving a single performance of a service is often very small. However, there are no viable, widely-accepted micropayment systems that would support a pay-per-use pricing scheme for very small transaction amounts. There is simply no efficient way to sell a service for a fraction of a cent, or even for a few cents—all commonly-used payment methods have a transaction cost in excess of that amount.

In one embodiment of the invention, the merchant offers a customer credit toward one service when the customer uses another service. (Note that the term "customer" as used herein includes persons or entities with which the merchant has an existing commercial relationship, as well as persons or entities with which the merchant is attempting to establish a new relationship). The merchant can maintain an account of these credits, which obviates the problem of dealing in small monetary amounts (in current-dollar terms, the range between zero and a few tens of cents, for example). Furthermore, by maintaining such an account, the merchant can fine-tune the credit offered much more precisely than can a typical merchant of physical goods who operates a typical customer loyalty program. Different credit amounts, including fractional credits, can be given based on the behaviors the merchant wants to encourage or discourage. For example, if the merchant offered services A (which was inexpensive or free, and widely used) and B (which was relatively expensive to provide and not widely used), it could encourage users to try B by offering a credit toward B each time a customer used A. However, once a particular customer had begun to use B regularly, the merchant could reduce the credit earned by using A, or transition to a B-only credit plan, where a customer would earn credit for future performances of B by using B.

Embodiments of the invention are well-suited to providing a variety of somewhat specialized communication services. For general communication services such as telephone, pager or electronic mail service, the mere availability of the service may be so valuable that consumers are willing to enter into long- or indefinite-term, monthly service contracts even if they do not always use the full amount of service to which they are entitled. However, for more specialized services such as facsimile transmission and reception, voicemail, conference call management, or oral recitation of textual data by a machine, a customer might be unwilling to enter a monthly contract when it is uncertain whether he will use the service at all in a particular month. Such services could be excellent candidates for pay-per-use sales strategies, but for reasons already discussed, it may not be possible to sell them in that manner. However, by applying the fractional credit accounting and incentive system disclosed, it becomes feasible to offer these services on a pay-per-use basis.

In an embodiment of the invention, a merchant such as j2 Global Communications of Hollywood, Calif., could offer facsimile reception and transmission services to its customers. Both services may require equipment and telephone lines to communicate with traditional facsimile equipment, so some capital expenditure may be necessary to provide those services. However, for sending facsimiles, outbound calling charges are also incurred, and so that service may be more expensive to provide. Thus, while it might be possible to provide facsimile reception services for free, the merchant could not provide transmission services without charging the customer. By applying an embodiment of the invention, the merchant could introduce a customer to the transmission service on a basis that is equivalent to a free introductory period (by giving a certain number of free transmission credits), and transition smoothly over time to a pay-per-use model by adjusting the credits given for the customer's use of sending and receiving services, ultimately arriving at the point where the customer would have confidence in the commercial relationship and would be willing to leave funds on account with the merchant to pay for future facsimile transmissions. In one specific application of an embodiment of the invention, a customer could earn credits to send a first number of outbound facsimile pages each time he receives a second number of inbound pages (both the first number and the second number being selectable by the merchant).

Figure 1B:
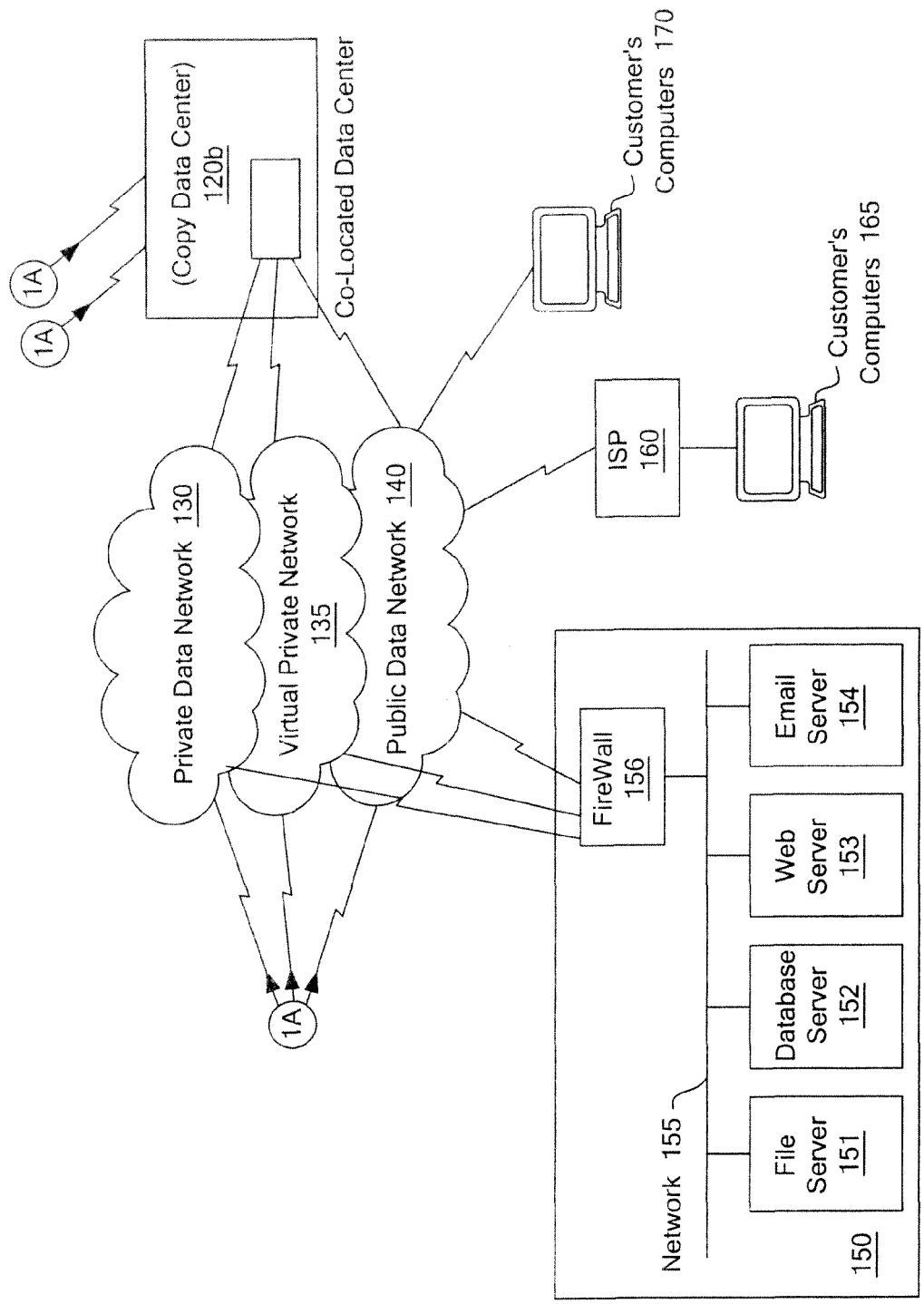

FIGS. 1A and 1B depicts a number of elements that may be involved in one or more embodiments of the invention that involve providing fax and voicemail services. A merchant such as j2 Global Communications of Hollywood, Calif., may maintain one or more co-located data centers 120a, 120b, which may be located in diverse physical locations. Such diverse locations may be chosen to facilitate connections 111a, 111b to local telephone switching stations (not shown) that are part of a public switched telephone network (PSTN) 110. Connections to local telephone switching stations may be desired because they allow the connected machines to be accessed through the PSTN by a local phone number (as opposed to a long-distance phone number). For example, if a co-located data center was placed in Tokyo, Japan, then the connected machines could place and receive inexpensive local phone calls to other phones in Tokyo, and less-expensive calls to and from other locations in Japan, as compared to such calls placed to or from a machine located in Geneva, Switzerland.

The co-located data centers may contain a number of server functions such as web server 121, electronic mail (e-mail) server 122, database server 123, voice mail server 124, and fax server 125. Each function may be distributed among a number of physical machines, or a number of functions may be consolidated in one machine. The machines may be connected to a data communication network 126, which allows them to communicate with each other and with a network routing and/or security device such as firewall 127.

Each co-located data center may be able to communicate with other centers and/or with a central data center 150 through a variety of data networks, such as private data network 130, virtual private network (VPN) 135, and/or public data network 140. The Internet is a well-known example of a public data network. Data transmitted over a private network are relatively secure against eavesdropping, but data transmitted over a public network such as the Internet may be exposed to third parties at many points. A VPN uses encryption to transmit data securely between two locations over either public or private data networks. Data are much less vulnerable to eavesdropping and modification while in transit across a VPN, so the computers using the VPN to communicate may not need to encrypt their data separately to protect it, although such encryption may provide additional security.

The merchant may operate a central data center 150, containing server functions such as file server 151, database server 152, web server 153, and email server 154. Each server function may be distributed across a number of physical machines, or several server functions may be consolidated on a single physical machine. Each machine may be connected to a network 155, which may provide access to private data networks 130, VPNs 135, and/or public data networks 140 through a network routing and/or security device such as firewall 156.

The merchant's customers and other participants in an embodiment of the invention include fax machines 100 and customers who connect to the PSTN by means of a landline 101 or a cell phone 102. Customers may interact with services provided by the merchant over a data network by means of computers 165 and 170, which may be connected directly to a public data network 140 or to the network through an ISP 160.

A specific example of the way in which facsimile reception could be provided may be explained with reference to FIGS. 1A and 1B. A person who wished to transmit a facsimile to a customer could send it through PSTN 110 from his fax machine 100 to a fax server 125 located in one of the merchant's co-located data centers 120a, 120b. The fax server could convert the facsimile signal into one or more tag image file format (TIFF) files. These files could be assembled into an e-mail message and sent directly to an e-mail address of the customer by e-mail server 122, where the customer's e-mail address could be obtained from database server 123. For added security, the message could be encrypted prior to transmission by formatting the message as an S/MIME message. The customer could view the facsimile by retrieving the e-mail message, decrypting it if necessary, and displaying the TIFF file attachments.

Alternatively, to provide increased security without the difficulty of maintaining encryption key information for each customer, the merchant could arrange a VPN connection from a co-located data center to a data center serving a number of customers (not shown). The e-mail containing the TIFF attachments could be transmitted to the data center serving a number of customers securely over the VPN, and could later be retrieved from the second data center by the customer.

In yet another alternative, the merchant could transmit the e-mail message from its co-located data center 120a securely by means of a VPN connection 135 to its own central data center 150. Once received in the central data center, the TIFF attachments could be removed from the e-mail message, encrypted, and stored on database server 152. Then, a notification e-mail message could be sent from the e-mail server 154 to the customer's computer 165 or 170, informing the customer that a facsimile was available for viewing. The customer could connect to the merchant's web server 153 through public data network 140, using a secure protocol such as HTTPS, authenticate himself to the web server through an appropriate challenge-and-response sequence, and download or display the facsimile from the database server 152. This alternative may provide favorable security characteristics because the facsimile data are always protected by encryption while being transmitted from one place to another.

To provide facsimile transmission services, the merchant could accept electronic mail sent from a customer's computer (165 or 170) to the merchant's mail server 154. This mail could contain a destination facsimile number and an attached document or image file to be transmitted. A server in the central data center could determine which co-located data center would provide the best connection to the destination facsimile machine, where the best connection may be selected on the basis of geographical proximity, low outbound calling cost, quality of connection, or other criteria. Once a "best" data center was selected, the email could be forwarded to the email server there, and then to a facsimile server. The facsimile server could convert the document or image file into a format suitable for transmission via facsimile, and then connect to the destination facsimile machine and send the converted document or image. After transmitting the document (or after attempting but failing to transmit the document), the facsimile server could transmit an email message notifying the customer of the result of the transmission.

In another embodiment of the invention, voice message communication services may be promoted. A customer could be provided with a telephone number that is connected to inbound call processing equipment. When a calling party dials the number, he would be asked to leave a voice message for the customer. When a message has been recorded, the customer could be notified through electronic mail or other means, and can retrieve the message at his leisure. Alternatively, the message could be converted into an electronic format and transmitted directly to a network address of the customer, without the need to store it on any of the merchant's systems.

Figure 2:
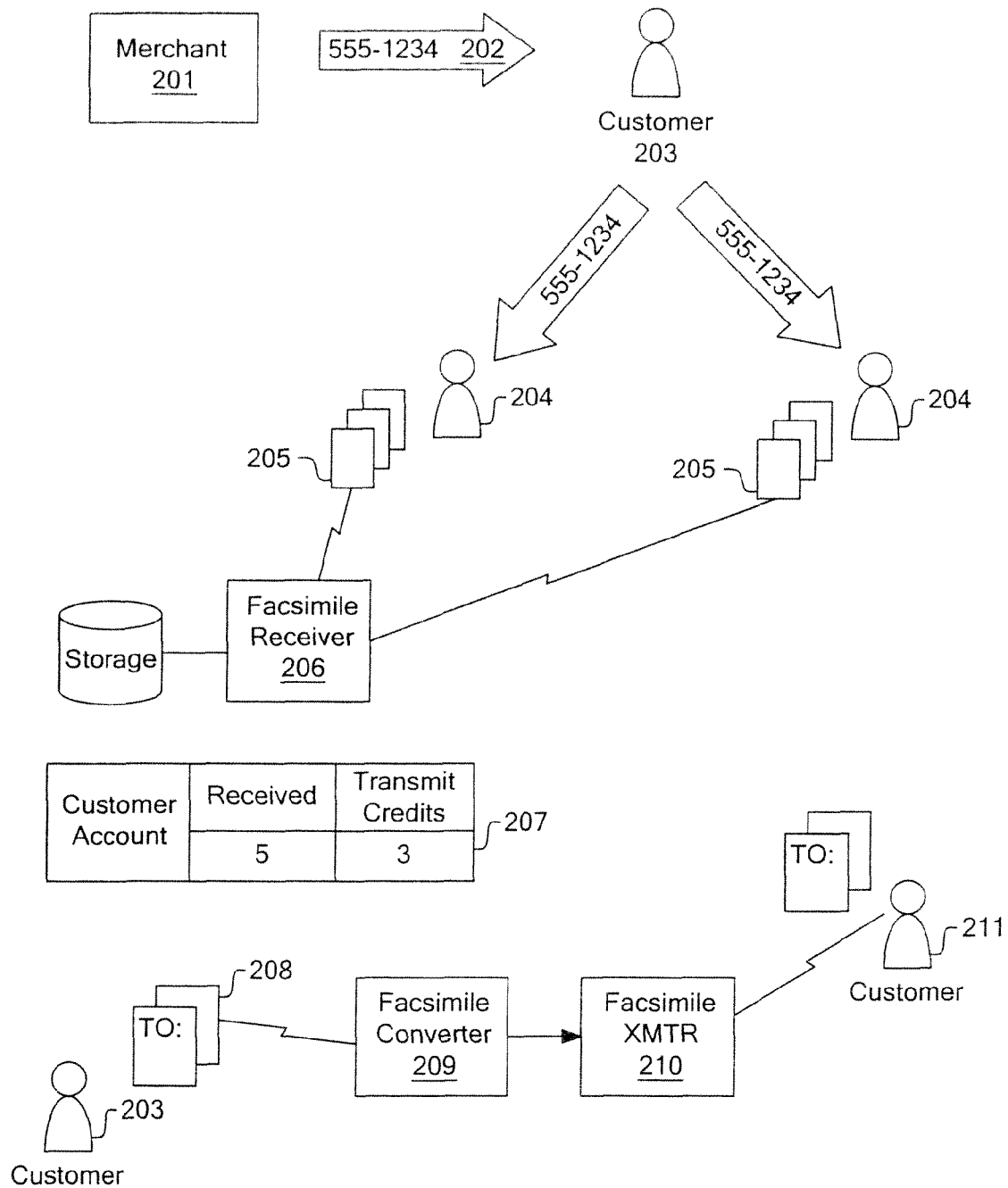
FIG. 2 depicts an embodiment of the invention wherein a customer who uses the merchant's system to receive Y facsimile pages earns credit to use the merchant's system to transmit X facsimile pages.

In the context of facsimile and/or voice mail reception and facsimile transmission services, the embodiment of the invention depicted graphically in FIG. 2 would permit the merchant to offer to transmit X facsimile pages for a customer each time the customer receives Y voice mail messages or facsimile pages, where "X" and "Y" are non-negative numbers, and "X" need not be an integer. The merchant 201 would provide a telephone number 202 to the customer 203, where the telephone number was connected to a device 206 maintained by the merchant that can record voice mail messages and/or receive facsimiles. The customer could give the telephone number to third parties 204 as the customer's own voice mail or facsimile number. When a voice mail message or facsimile is sent to that telephone number 205, the merchant's device 206 receives it and may retransmit it to the customer, store it locally, or forward it to a central repository for later retrieval by the customer. In addition, the device 206 may notify the customer that the message or facsimile has been received. When Y messages and pages have been received, the customer's account 207 is credited so that the customer can send X facsimile pages by using the merchant's equipment, according to the method described above. After transmission, the merchant could deduct the number of pages sent from the customer's credit balance.

Another communication service that is suitable for promotion though this invention is conference call management. A merchant could provide a telephone number to a customer, where the telephone number is connected to equipment that can receive multiple callers and connect them in a conference-call fashion. The telephone number could be dedicated to conferences hosted by the customer, or it could be allocated only temporarily to the customer for a limited time.

Another communication service that is suitable for promotion through this invention is oral recitation of textual data. Many consumers receive information in electronic form, through electronic mail or other channels. However, when a customer lacks the necessary equipment to retrieve and/or review the information, a proxy service that can access the information and communicate it to the customer may be useful. This service comprises receiving a voice telephone call from the customer, identifying textual data that the customer wishes to review, locating the data and reading it to the customer over the voice telephone connection. The identification, location, and reading can all be performed by an automated attendant system.

Another communication service that is suitable for promotion through this invention is "find-me/follow-me." In this service, a customer can obtain a special telephone number that is connected to a find-me/follow-me server, which is capable of locating the customer and connecting calls to him based on a set of rules and other information. Thus, calls from certain originating phone numbers might be forwarded to the customer's home phone, cell phone, or a phone near the customer's present physical location (if that location was known). Alternatively, unwanted calls might be directed to voicemail or simply dropped after a notification that the customer was "presently unavailable."

Figure 3:
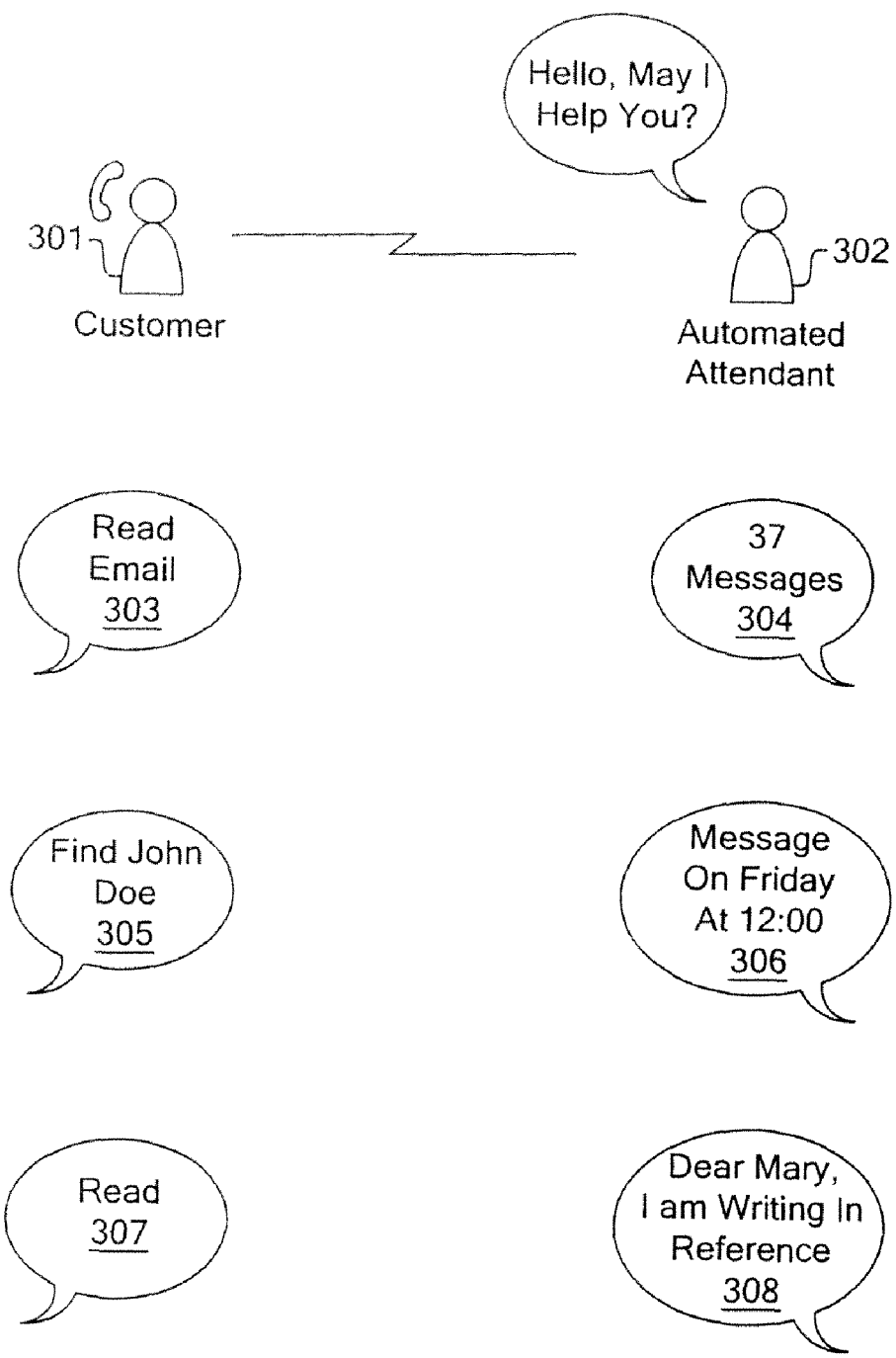
FIG. 3 depicts a possible interaction between a customer and an automated server, in a service provided through another embodiment of the invention.

A sample interaction with such an automated attendant is depicted in FIG. 3. The customer 301 places a voice call to the automated attendant 302, and issues a request to "read e-mail," 303. The attendant responds with the number of messages found 304. The customer instructs the attendant to find a particular message 305, and the attendant responds with information 306 about any messages located. Finally, the customer can instruct the attendant to read the message 307, and the attendant complies 308.

It will be apparent to one of ordinary skill in the art that other communication services, beyond those discussed previously, can also be promoted by means of the invention.

Possible promotion patterns include offering to transmit X facsimile pages for free for each Y voice mail messages or facsimile pages received, up to a selectable maximum of number of pages or messages in either direction, or up to a maximum number of pages or messages per unit of time such as a day, week, or month. Pages transmitted in excess of the free pages earned might be billed at an appropriate rate determined by the merchant, which may incorporate such considerations as reduced rates for certain destinations or for volume exceeding a certain number of pages. Alternate promotion patterns include offering a selectable number of minutes of conference call activity or interaction with an automated attendant to review electronic information in exchange for receiving or transmitting a number of facsimile pages.

An embodiment of the invention may be a machine-readable medium having stored thereon instructions, which cause a processor to perform a process according to an embodiment of the invention. In other embodiments, operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over a data network such as the Internet.

The applications of the present invention have been described largely by reference to specific examples and in terms of particular allocations of functionality to certain hardware components. However, those of skill in the art will recognize that alternate communication services may also be promoted in the manner disclosed, and that hardware and software functionality may be distributed among a large number of cooperating machines or may be performed by a single device. Such variations and implementations are understood to be apprehended according to the following claims.

What is claimed is:

1. A computer system that provides a communication service to customers, comprising:
   a fax server to receive a plurality of inbound fax pages at a telephone number of a customer and at no charge to the customer; and
   a web server to indicate a credit when a number of said inbound fax pages have been received, wherein the credit enables the customer to make one or more fax transmissions, using the fax server, to send a number of outbound fax pages at a price that is less than a usual price for sending said number of outbound fax pages.

2. The computer system of claim 1 further comprising:
   an email server to accept a request from the customer to send one or more outbound fax pages, wherein the web server is to enable the fax server to make a fax transmission to send the requested outbound fax pages pursuant to the credit.

3. The computer system of claim 2 wherein the fax transmission requested by the customer contains more than said number of outbound fax pages enabled by the credit, being an excess number of outbound fax pages, the web server to charge the cost of transmitting the excess number of outbound fax pages to the customer at the usual price.

4. The computer system of claim 1 further comprising a database server to store the credit in a customer account maintained for the benefit of the customer.

5. The computer system of claim 1 wherein the web server indicates the credit as enabling the customer to send said number of outbound fax pages for free.

* * * * *